United States Patent [19]

Hinds

[11] Patent Number: 5,494,326
[45] Date of Patent: Feb. 27, 1996

[54] OVERHEAD ELECTRICAL FIXTURE AND PORTABLE LOWERING TOOL THEREFOR

[76] Inventor: Richard A. Hinds, 7 Deer Tract Dr., Littlemountain, S.C. 29075

[21] Appl. No.: 362,178

[22] Filed: Nov. 22, 1994

Related U.S. Application Data

[62] Division of Ser. No. 187,607, Jan. 26, 1994, Pat. No. 5,393,245.

[51] Int. Cl.⁶ ..................................................... A47F 13/06
[52] U.S. Cl. .......................................... 294/19.1; 362/403
[58] Field of Search ............................... 294/19.1, 22, 23, 294/24; 43/18.1, 25, 17.5; 362/403

[56] References Cited

U.S. PATENT DOCUMENTS

| | | | |
|---|---|---|---|
| 2,936,193 | 5/1960 | Mannen | 294/19.1 |
| 3,618,253 | 11/1971 | Edwards et al. | 43/18.1 |
| 4,505,063 | 3/1985 | Price et al. | 43/17.5 |
| 4,697,375 | 10/1987 | Mills | 43/17.5 |
| 4,823,496 | 4/1989 | Powell | 43/25 |
| 4,845,879 | 7/1989 | Urso | 294/24 |
| 5,330,243 | 7/1994 | Held | 294/19.1 |

FOREIGN PATENT DOCUMENTS

| | | | |
|---|---|---|---|
| 2224237 | 1/1974 | Germany | 294/19.1 |

Primary Examiner—Dean Kramer
Attorney, Agent, or Firm—Michael A. Mann

[57] ABSTRACT

An overhead electrical fixture including a lowerable serviceable fixture portion that may be readily lowered by a portable lowering tool to facilitate servicing by a technician at ground level. The overhead fixture includes a mounting base adapted to be secured relatively high above ground level, such as in a church. In the normal operating position, the serviceable fixture portion is releasably secured to the mounting base by a relatively short length of cable secured at one end to the serviceable fixture portion, and at the opposite end to a cable connector, such as a ring. The ring rests against the mounting base adjacent a slotted opening in the normal operating position. The ring may be engaged by a hook of the lowering tool and rotated so that the ring may pass through the slotted opening in the mounting base to effect release and lowering of the serviceable fixture portion. The portable lowering tool includes a series of telescoping sections, a winch including a supply of cable stored thereon, and a brake to prevent paying out of the cable when the winch handle is released by the user. The supply of cable from the winch of the portable lowering tool is payed out to lower the serviceable fixture portion and may be rewound to raise the serviceable fixture portion to the operating position after servicing is completed.

8 Claims, 5 Drawing Sheets

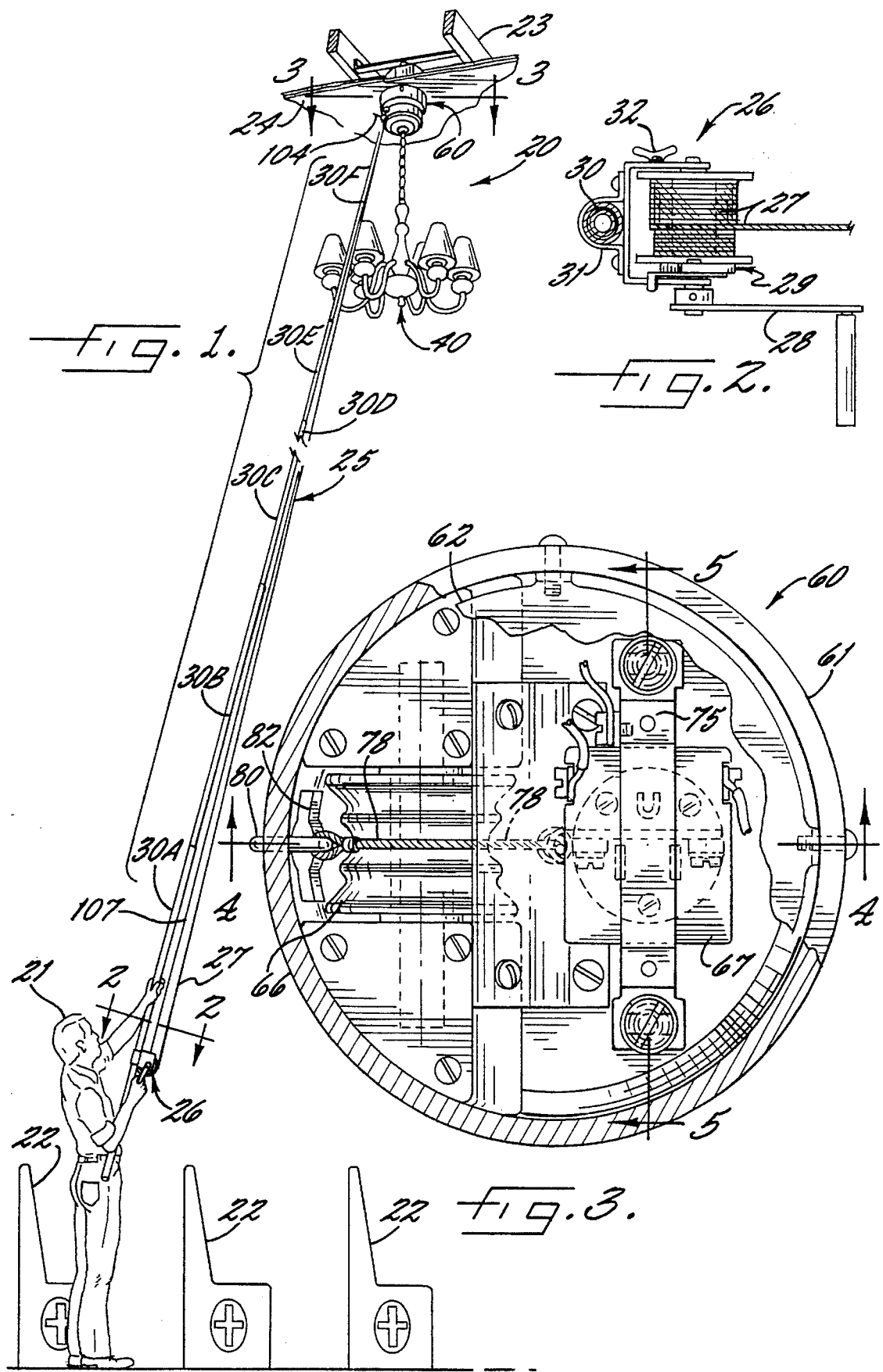

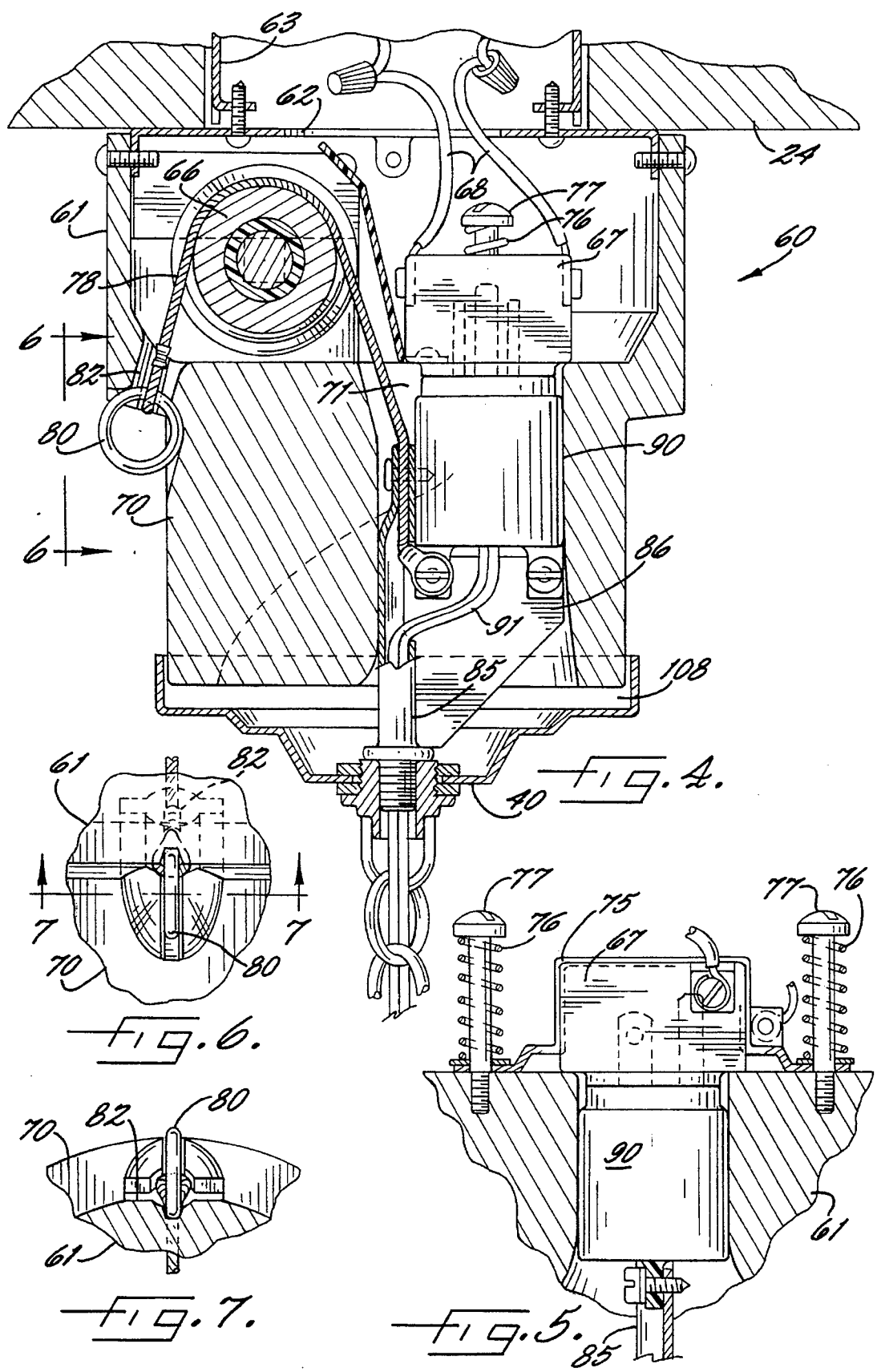

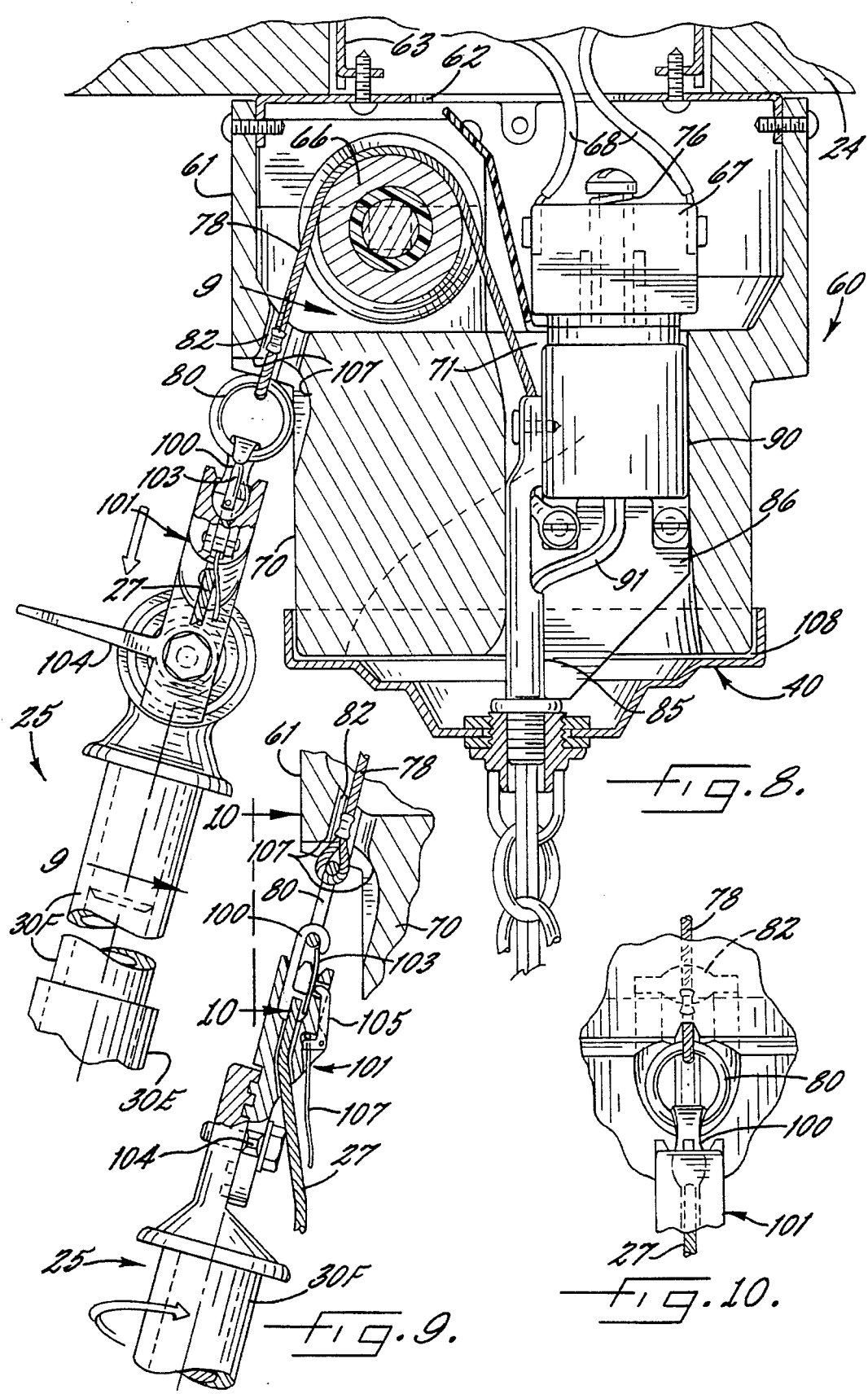

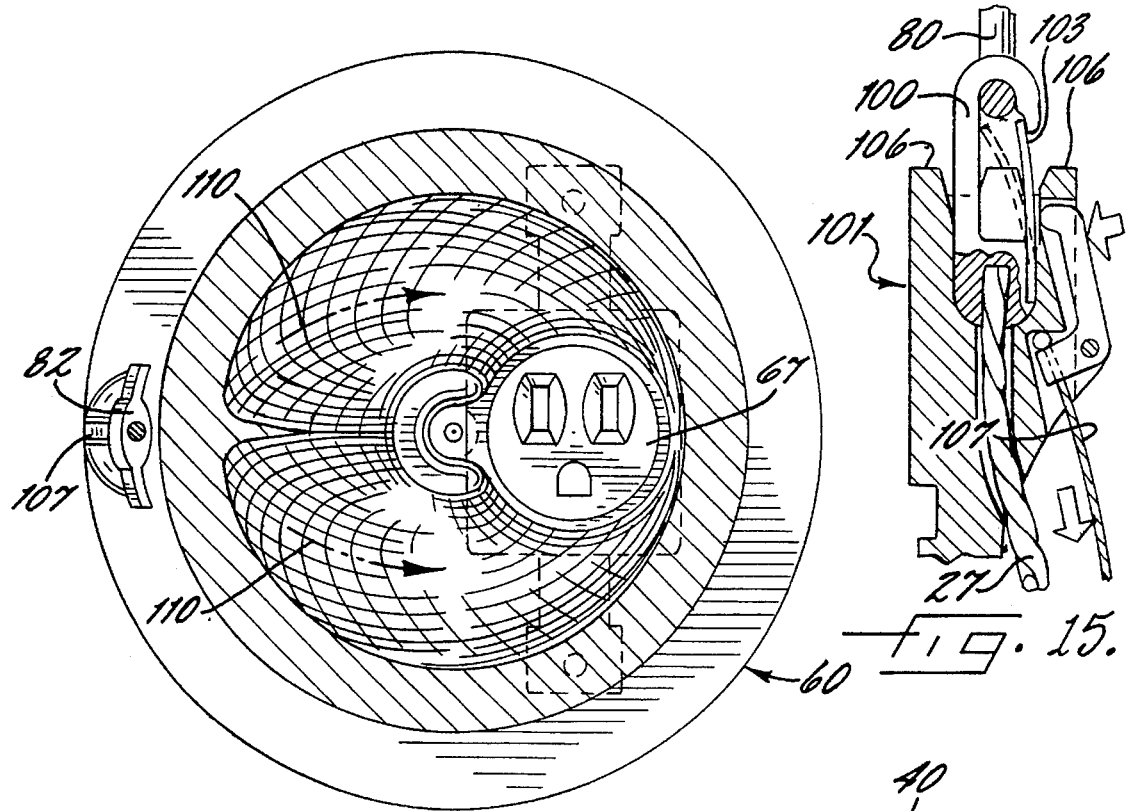
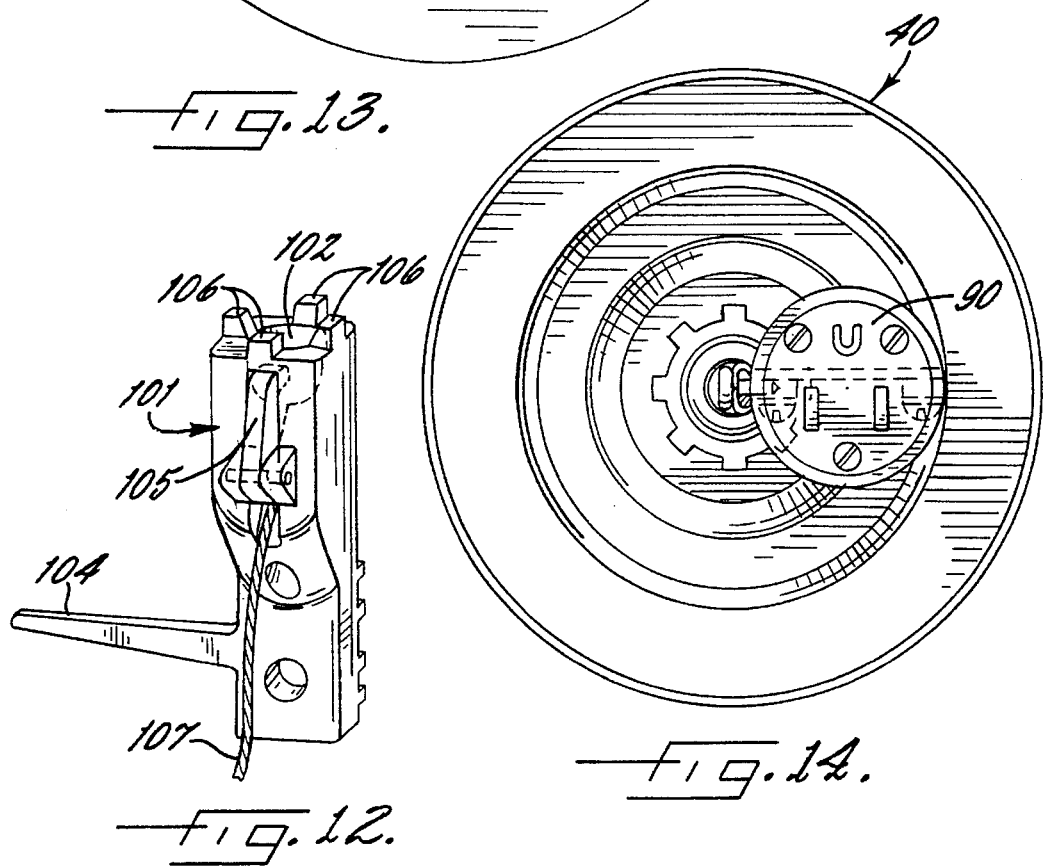

OVERHEAD ELECTRICAL FIXTURE AND PORTABLE LOWERING TOOL THEREFOR

This is a divisional of application Ser. No. 08/187,607 filed on Jan. 26, 1994, now U.S. Pat. No. 5,393,245.

FIELD OF THE INVENTION

The invention relates to the field of electrical fixtures and, more particularly, to an overhead electrical fixture having a serviceable fixture portion which may be lowered to ground level for servicing and a portable tool for effecting lowering of the serviceable fixture portion.

BACKGROUND OF THE INVENTION

In many lighting applications, especially commercial lighting applications, an overhead lighting fixture is mounted relatively high above ground or floor level. The overhead lighting fixtures in a church are exemplary of this type of commercial lighting application. These fixtures may be fifteen to forty feet above the level of the floor. In addition, access immediately beneath the fixtures is limited due to the placement of rows of closely spaced pews.

Thus, replacement of the lights carried by such lighting fixtures is greatly complicated by the inability to position a conventional self-supporting or folding ladder on the floor below the fixture because of the pews. Moreover, many such self-supporting ladders do not have sufficient height to permit a technician to reach the lighting fixtures. A conventional extension ladder, although perhaps having sufficient reach to extend to the lighting fixture, may not be supported with sufficient stability to provide adequate safety. Accordingly, many burned-out lights must go unreplaced or worker safety unnecessarily compromised to replace the lights.

There are many other commercial settings where overhead lights are also difficult to access with conventional ladders. For example, in a factory setting, operating machinery or other work areas may be utilized beneath the lighting fixture making access with a conventional ladder impossible.

Attempts have been made to address the problem of servicing lighting fixtures which are suspended high above the ground or floor, or otherwise difficult to access using conventional equipment, for example, U.S. Pat. No. 4,430,694 to Koivumaki discloses a series of ceiling mounted fixtures mounted on horizontal tracks or rails so that the lighting fixtures can be laterally moved to another adjacent area for servicing. This approach requires an initial investment in rails and other hardware and presumes that an adjacent space provides better access. This approach is unusable or undesirable in many applications.

U.S. Pat. No. 1,473,713 to Thompson, and dating from 1919, discloses a lighting fixture having a fixed mounting base including a rotatable pulley, and wherein a length of rope is fed over the pulley and connected between a ground level location and the lowerable fixture. U.S. Pat. No. 1,454,855 to Larkins shows a similar fixture having a link chain in place of the rope.

Unfortunately, a rope or chain permanently connected to the lowerable fixture portion must be sufficiently long to extend down to adjacent ground level and permit lowering of the fixture portion. Accordingly, such a rope or chain is unsightly, interferes with efficient utilization of the space below the fixture, and creates an additional maintenance problem of ensuring the integrity of the ropes or chains on a periodic basis. For a large number of fixtures, or relatively high mounting of such fixtures, the ropes or chains are simply impractical.

While overhead lighting fixtures represent a particular and well known example requiring intermittent access for service or maintenance, other overhead electrical fixtures may also have serviceable fixture portion requiring periodic or intermittent access for maintenance, for example, public address systems, scoreboards, and the like may include portions that are most conveniently and safely serviced adjacent ground level.

SUMMARY OF THE INVENTION

It is therefore an object of the present invention to provide an overhead electrical fixture including a serviceable fixture portion that may be readily lowered to ground level to permit periodic maintenance or maintenance as needed.

It is another object according to the invention to provide such an overhead electrical fixture which is simple in construction, yet reliable and rugged, and which does not require a permanently connected external lowering chain, rope or cable extending down adjacent ground level.

It is yet a further object of the present invention to provide a portable tool and method for effecting ready lowering of a serviceable fixture portion of an overhead electrical fixture.

These and other objects and advantages of the present invention are provided by an overhead electrical fixture including a mounting base adapted to be fixedly secured relatively high above ground level, a serviceable fixture portion movable between an operating position in engagement with the mounting base and a servicing position adjacent ground level and below the mounting base, and latching means releasably connected between the mounting base and the serviceable fixture for releasably securing the serviceable fixture in the operating position. The latching means preferably includes a cable connector for permitting connection to a supply of cable payed out from adjacent ground level to lower the serviceable fixture portion, such as by use of a portable lowering tool according to another aspect of the invention and as described below. While the term "cable connector" is used herein to more clearly distinguish this type of connector from electrical connectors, it would be readily understood that the term applies to a connector for chains, ropes, and the like.

The latching means includes a relatively short length of cable having one end secured to the serviceable fixture portion and an opposite end secured to the cable connector. The relatively short length of cable is supported by a pulley rotatably mounted on the mounting base. The pulley also permits the supply of cable payed out from adjacent ground level to readily pass thereover and thus support the serviceable fixture as it is lowered from the operating position to the servicing position.

The cable connector of the latching means is preferably a ring which can be rotated and aligned to pass through a slotted opening in the mounting base to release the serviceable fixture portion from the operating position. The weight of the serviceable fixture portion biases the serviceable fixture portion apart from the mounting base when in the operating position to therefore maintain the ring in a latched position against portions of the mounting base adjacent the slotted opening.

A first electrical connector is mounted on the mounting base and a second mating electrical connector is mounted on the serviceable fixture portion so that the first and second electrical connectors are engaged when the serviceable fixture portion is in the normal operating position, and disengaged when the serviceable fixture is in the servicing position. To provide proper alignment of the electrical connectors when the serviceable fixture is raised into the operating position, camming means is provided on mounting base. The camming means preferably is formed by a vertically oriented tubular portion of the mounting base having converging inner sidewalls for contacting the second electrical connector and guiding it into proper alignment with the first electrical connector as the serviceable fixture is raised to the operating position.

As would be readily understood by those skilled in the art, the overhead electrical fixture may preferably be a lighting fixture. Accordingly, the serviceable fixture then includes one or more sockets for mounting electrical lights therein.

Another aspect of the present invention is a portable tool for effecting lowering of the serviceable fixture portion to thereby facilitate servicing adjacent ground level. The portable tool includes a pole having a lower end adapted to be grasped by a user and manipulated to position the upper end of the pole adjacent the overhead electrical fixture. The pole is preferably formed of a series of two or more telescoping tubular sections with locking detents or other means for maintaining the sections in an extended position, yet permitting compact storage of the pole in the collapsed position.

A winch is mounted to the pole and includes a supply of cable stored thereon. A hook, serving as a cable connector, is secured to a free end of the cable for connecting to the ring of the serviceable fixture portion to thereby permit lowering of the serviceable fixture portion by operation of the winch by the user. The winch preferably includes a brake for preventing the cable from being inadvertently payed out when the crank handle of the winch is released by the user.

The pole also preferably includes sight means carried by the upper end of the pole for facilitating positioning and alignment of the hook relative to the overhead electrical fixture. The sight means is preferably an elongate member connected to the pole and extending radially outwardly therefrom. The elongate member may be several inches long and thus be readily viewable by the user positioned 15 to 40 feet below the overhead fixture. The pole also preferably includes guide means, carried by the upper end of the pole, to receive the hook therein and maintain the hook in a predetermined angular orientation with respect to the axis of the pole so that the user may readily engage the hook onto the ring.

The upper end of the pole also includes a series of lengthwise extending prongs, adjacent the guide means, for engaging corresponding recesses in portions of the mounting base adjacent the slotted opening thus providing pole stabilizing means. The stabilizing means assists in keeping the upper end of the pole adjacent the mounting base in spite of the relatively long moment arm created by the pole, thus reducing user fatigue and increasing the operating safety of the portable tool.

The method according to the invention includes grasping and guiding the pole so that the two cable connectors, one carried by the portable tool and the other connected to the serviceable fixture portion, engage. As noted above, the first cable connector is preferably a ring and the second cable connector is preferably a hook.

The serviceable fixture portion is then released from the mounting base by rotating the ring so that the ring aligns with the slotted opening in the mounting base. Cable is then payed out from the winch to suspend and lower the serviceable fixture portion from the mounting base. The lowered serviceable fixture portion may then be repaired or bulbs therein replaced if the fixture is a lighting fixture. The serviceable fixture may also be raised back to the operating position by reversing the lowering steps.

Since the pole is preferably an extensible pole including a series of telescoping sections, the pole is first extended to the desired length to reach the overhead electrical fixture. After use the pole may then be collapsed and thus more easily stored until subsequently needed.

BRIEF DESCRIPTION OF THE DRAWINGS

FIG. 1 is a perspective view of the overhead electrical fixture and portable lowering tool according to the present invention in use in a church.

FIG. 2 is a view of the portable lowering tool showing the cable winch and taken along line 2—2 of FIG. 1.

FIG. 3 is a fragmentary view of the mounting base of the overhead electrical fixture taken along lines 3—3 of FIG. 1.

FIG. 4 is a cross-sectional view of the overhead electrical fixture taken along lines 4—4 of HG. 3.

FIG. 5 is an enlarged cross-sectional view of a portion of the overhead electric fixture showing the disengageable electrical connectors and taken along lines 5—5 of FIG. 3.

FIG. 6 is a side view of a portion of the overhead electrical fixture showing the ring and slotted opening of the mounting base taken along lines 6—6 of FIG. 4.

FIG. 7 is a bottom view of the portion of the overhead electrical fixture taken along lines 7—7 of FIG. 6.

FIG. 8 is a side view, partially in section, showing the portable lowering tool being operated to pull the ring outward from the mounting base and thereby permit rotating of the ring.

FIG. 9 is a side view, partially in section, taken along line 9—9 of FIG. 8 and showing the portable lowering tool being rotated to align the ring with the slotted opening to thereby release the serviceable fixture portion from the mounting base.

FIG. 10 is a side view of a portion of the mounting base and portable lowering tool taken along lines 10—10 as shown in FIG. 9.

FIG. 12 is a perspective view of an upper end fixture, removed from the telescoping pole, of the portable lowering tool according to the invention.

FIG. 13 is a plan view of the mounting base of the overhead electrical fixture taken along lines 13—13 as shown in FIG. 11.

FIG. 14 is a bottom view of the mounting base of the overhead electrical fixture taken along lines 14—14 of FIG. 11.

FIG. 15 is a side cross-sectional view of the upper end fixture and hook of the portable lowering tool as shown in FIG. 12 engaging the ring of the overhead electrical fixture.

DESCRIPTION OF THE PREFERRED EMBODIMENTS

Figure 11:
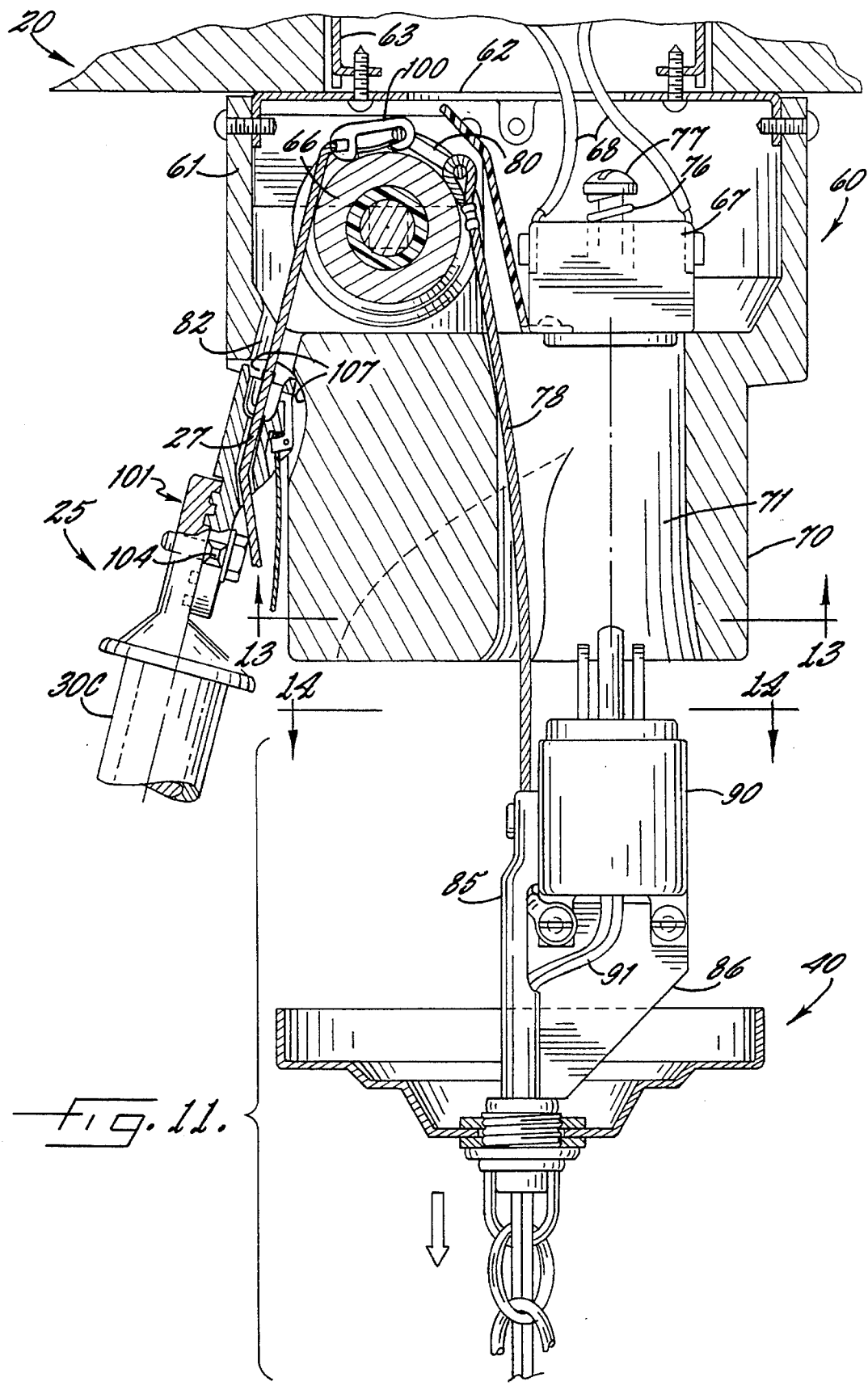
FIG. 11 is a side view, shown partially in section, showing the serviceable fixture portion in a partially lowered position from the mounting base using the portable lowering tool according to the invention.

The present invention will now be described more fully hereinafter with reference to the accompanying drawings, in which preferred embodiments of the invention are shown.

This invention may, however, be embodied in many different forms and should not be construed as limited to the embodiments set forth herein. Rather, applicant provides these embodiments so that this disclosure will be thorough and complete, and will fully convey the scope of the invention to those skilled in the art. Like numbers refer to like elements throughout.

Referring to FIG. 1, there is shown the overhead electrical fixture, more particularly, an overhead lighting fixture 20 in combination with a portable lowering tool 25 connected thereto according to the present invention. The lowering tool 25 permits ready lowering of a serviceable fixture portion 40 of the lighting fixture 20 by a maintenance technician 21 for servicing of the lighting fixture, such as for replacing burned-out bulbs. The mounting base 60 for the fixture is fixedly secured to structural members 23 of the ceiling 24 in a conventional fashion. Although only a single lighting fixture 20 is shown, it would readily be understood that many such fixtures would typically be used in typical settings, such as a church as illustrated.

A conventional ladder of the prior art, such as an extension ladder or folding self-supporting ladder, would be extremely difficult to position in the space between the rows of pews 22 in a church. The lowering tool 25 in combination with the overhead electrical fixture 20 according to the invention permits ready lowering of a serviceable fixture portion 40 so that it may be serviced adjacent ground level.

As shown in FIGS. 1 and 2, the lowering tool 25 according to the present invention includes a winch 26 including a supply of cable 27 stored thereon, a crank handle 28, and a conventional disk brake 29. As would be readily understood by those skilled in the art, an electrically powered winch with suitable limit switches may be used in place of the illustrated manually operated winch 26.

A bracket 31 secures the hand winch 26 to the lower end of the portable lowering tool 25. The disk brake 29 prevents the winch 26 from paying out cable if, for any reason, the crank handle 28 is released by the maintenance technician 21. Thus, the disk brake 29 of the winch 26 provides a safeguard against accidental release of the serviceable fixture portion 40. The winch 26 also preferably includes appropriate gearing to permit handling of a load having a weight of typically up to about 70 lbs., such as for a commercial lighting fixture. A commercially available winch 26 of the type described is available from Thern, Inc. of Winona, Minn. having the mode designation M4021B.

The portable lowering tool 25 includes a plurality of extendable telescoping sections 30A–30F, preferably formed of fiberglass or other suitable lightweight, yet strong, and preferably insulating material. A preferred number of sections for many applications is six, wherein each section is about 5 feet long. The telescoping sections 30A–30F may preferably be provided by a conventional "hot stick" of the type available from Hastings Fiber Glass Products Inc. of Hastings, Mich. under any of the model designations ST-216 through ST-235. The telescoping sections preferably include conventional locking detents or other means for releasably locking adjacent sections in the extended position.

The upper end portion of the portable lowering tool 25 includes other unique structural features as described more fully below with reference to operation of portable lowering tool in combination with the lighting fixture 20. Referring to FIGS. 3–7, there is shown the overhead lighting fixture 20 with the serviceable fixture portion 40 engaged with the mounting base 60 in the operating position. The mounting base 60 of the lighting fixture is attached to the ceiling 24 by conventional means including a bracket 62 connected to an upper portion of the housing 61 of the mounting base and secured to an electrical box 63 which in turn is secured in a recessed fashion in the ceiling 24.

The upper housing portion 61 includes a rotatably mounted pulley 66 and a first electrical connector 67 positioned therein. A lower housing portion 70 of the mounting base 60 includes an axial bore 65 through which cable may be fed to lower the serviceable fixture portion 40.

The weight of the serviceable fixture portion 40 provides tension to a relatively short length of cable 78 that is secured at one end to the serviceable fixture portion and at the other end to a cable connector. In the illustrated embodiment, the cable connector is a ring 80. The ring 80 is thus pulled inwardly and maintained against portions of the upper housing portion 61 adjacent a slotted opening 82 by the weight of the serviceable fixture portion 40. The ring 80, slotted opening 82, and the short length of cable 78 thus provide releasable latching means for the overhead electrical fixture 20 to retain the user serviceable fixture portion 40 in the operating position, while also permitting release of the latching means to thereby permit lowering of the serviceable fixture portion.

In the operating position, the first electrical connector 67 carried by the housing is matingly engaged with a second electrical connector 90 carried by the serviceable fixture portion 40. As best shown in HG. 5, the upper housing portion 61 includes a bracket 75 mounting the first electrical connector 67. The bracket is slidably positioned on a pair of posts 77 and spring biased by respective springs 76 to urge the first connector 67 into mating engagement with the second electrical connector 90. The second electrical connector 90 is secured at a side thereof to a shaft 86 of the serviceable fixture portion 40 and secured at a lower portion thereof by a flange 87 which is also connected to the shaft.

As would be readily understood by those skilled in the art, the electrical connectors 67, 90 may be provided by conventional three prong receptacles and plugs, respectively, as illustrated. A four prong plug or other configuration of electrical connector may also be used. The electrical connection between the AC source and the serviceable fixture portion 40 is thus established by the associated wiring 68, 91 extending from each respective electrical connector 67, 90.

Referring now to FIGS. 8–12, the release of the serviceable fixture portion 40 and lowering thereof is best understood. The lower end of the portable tool 25 is grasped and guided to engage the ring 80 serving as a first cable connector and a hook 100 serving as a second cable connector in the illustrated embodiment. Thus, the relatively short length of cable 78 of the latching means is secured to the supply of cable 27 stored on the winch 26 of the portable tool 25.

As shown best in FIGS. 12 and 15, the upper end of the portable tool 25 includes an end fixture 101 which has an axial slotted opening 102, generally rectangular in cross-section, to receive therein the generally rectangular body portion of the hook 100 and maintain the hook in a predetermined angular orientation with respect to the axis of the pole. The portable tool end fixture 101 and the axial slotted opening 102 thus serve as a guide means for the hook 100. The end fixture 101 also preferably carries an elongate member 104 extending radially outwardly from the fixture to serve as sight means to permit the user at ground level to be assured of having the proper orientation of the upper end of the pole and to assist the user in engaging the hook 100 and the ring 80. Preferably the elongate member 104 is aligned to extend radially outwardly from the mounting base 60 of the overhead lighting fixture 20 when the hook 100 is oriented to engage the ring 80.

The hook 100 includes an outwardly biased spring clip 103 for locking the hook and ring 80 when lowering the serviceably fixture portion 40. The spring clip 103 may be released by pulling on the release cord 107 which pivots the release arm 105, pivotally mounted to the end fixture 101, thereby moving the spring clip from the locking position to an open position as shown in phantom lines in HG. 15. The release cord 107 extends downward from the end fixture 101 of the portable tool 25 (FIG. 1) and may be loosely secured to a suitable tie-down member 32 on the cable winch 26 (FIG. 2) so that the release cord is within the user's easy reach.

After the hook 100 and ring 80 are engaged, the user then pulls down slightly on the portable tool 25 as shown in FIG. 8 which slightly lifts the serviceable fixture portion 40 and permits the ring 80 to be rotated ninety degrees (FIGS. 9 and 10) so that the ring 80 is aligned with the slotted opening 82 in the mounting base 60. As shown in FIGS. 4 and 8, a relatively small gap 108 between the mounting base 60 and the serviceable fixture portion 40 permits the serviceable fixture portion to be raised upward against in its own weight.

Once the ring 80 is aligned with the slotted opening 82, the user may then pay out cable from the cable winch 26 to begin the lowering of the serviceable fixture portion 40 (FIG. 11). To assist in providing stability to the relatively long moment arm developed by the portable tool 25, the upper end of the fixture 101 preferably includes a series of prongs 106 (FIGS. 11 and 12) extending outwardly therefrom to mate with corresponding recesses 107 in the mounting base adjacent the slotted opening 82. The serviceable fixture portion 40 may thus be lowered to ground level where it may be readily serviced.

After servicing of the serviceable fixture portion 40 is completed, it may then be raised by essentially reversing the lowering steps. As the serviceable fixture portion 40 is raised, however, it must be guided as it nears its engagement position with the mounting base 60. More particularly the serviceable fixture portion must be at the proper angular orientation so that the electrical connectors 90, 67 will properly engage. As shown in FIGS. 13 and 14, camming means is provided on the mounting base 60 which includes vertically oriented converging inner sidewalls 110 for contacting the second electrical connector 90 carried by the serviceable fixture portion 40 and rotating same into alignment as it is raised. After the serviceable fixture portion 40 is returned to the operating position and latched into the operating position by rotating the portable lowering tool 25, the user may then pull the release cord 107 to disengage the hook 100 from the ring 80.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A portable tool adapted for effecting lowering of a lowerable serviceable fixture portion from an overhead electrical fixture including a mounting base fixedly secured relatively high above ground level, said portable tool comprising:

a pole having a lower end adapted to be grasped by a user and manipulated to position the upper end of said pole adjacent to the overhead electrical fixture;

a winch mounted on the lower end of said pole, said winch including a supply of cable stored thereon;

a hook secured to a free end of said cable and adapted for connecting to the serviceable fixture portion to permit lowering of same by operation of said winch by the user;

sight means carried by the upper end of said pole to facilitate positioning and alignment of said hook relative to the overhead electrical fixture by the user at ground level; and guide means carried by the upper end of said pole for receiving said hook therein and maintaining the received hook in a predetermined angular orientation with respect to the axis of said pole.

2. A portable tool according to claim 1 wherein said sight means comprises an elongate member connected at one end to the upper end of said pole and extending radially outwardly therefrom.

3. A portable tool according to claim 1 wherein said pole comprises a series of two or more extendable telescoping tubular sections.

4. A portable tool according to claim 1 further comprising a series of spaced apart prongs on an upper end thereof adapted for engaging a corresponding series of recesses on the mounting base of the overhead electrical fixture for stabilizing the upper end of said pole as the serviceable fixture portion is lowered.

5. A portable tool according to claim 1 wherein said winch further comprises a user operable crank handle and brake means operatively connected to said crank handle for preventing paying out of said cable when said crank handle is released by the user.

6. A portable tool adapted for effecting lowering of a lowerable serviceable fixture portion from an overhead electrical fixture including a mounting base fixedly secured relatively high above ground level, said portable tool comprising:

a pole having a lower end adapted to be grasped by a user and manipulated to position the upper end of said pole adjacent to the overhead electrical fixture;

a winch mounted on said pole, said winch comprising a supply of cable stored thereon, a user operable crank handle and brake means operatively connected to said crank handle for preventing paying out of said cable when said crank handle is released by the user;

a hook secured to a free end of said cable and adapted for connecting to the serviceable fixture portion to permit lowering of same by operation of said winch by the user; and a series of spaced apart prongs on an upper end thereof adapted for engaging a corresponding series of recesses on the mounting base of the overhead electrical fixture for stabilizing the upper end of said pole as the serviceable fixture portion is lowered.

7. A portable tool according to claim 6 wherein said pole comprises a series of two or more extendable telescoping tubular sections.

8. A portable tool according to claim 6 further comprising guide means carried by the upper end of said pole for receiving said hook therein and maintaining the received hook in a predetermined angular orientation with respect to the axis of said pole.

* * * * *